(12) United States Patent
Grimaud et al.

(10) Patent No.: US 11,880,414 B2
(45) Date of Patent: Jan. 23, 2024

(54) GENERATING STRUCTURED CLASSIFICATION DATA OF A WEBSITE

(71) Applicant: Criteo Technology SAS, Paris (FR)

(72) Inventors: Pierre Grimaud, Le Pecq (FR);
Jean-Sébastien Faure, Paris (FR);
Julien Duminy, La Garenne Colombes (FR)

(73) Assignee: Criteo Technology SAS, Paris (FR)

( * ) Notice: Subject to any disclaimer, the term of this patent is extended or adjusted under 35 U.S.C. 154(b) by 845 days.

(21) Appl. No.: 15/670,831

(22) Filed: Aug. 7, 2017

(65) Prior Publication Data
US 2019/0043095 A1  Feb. 7, 2019

(51) Int. Cl.
| | |
|---|---|
| *G06F 16/90* | (2019.01) |
| *G06F 16/906* | (2019.01) |
| *G06Q 30/0241* | (2023.01) |
| *G06Q 30/0601* | (2023.01) |
| *G06Q 30/0201* | (2023.01) |
| *G06F 16/951* | (2019.01) |
| *G06Q 30/0242* | (2023.01) |

(52) U.S. Cl.
CPC .......... *G06F 16/906* (2019.01); *G06F 16/951* (2019.01); *G06Q 30/0201* (2013.01); *G06Q 30/0242* (2013.01); *G06Q 30/0276* (2013.01); *G06Q 30/0277* (2013.01); *G06Q 30/0603* (2013.01); *G06Q 30/0627* (2013.01)

(58) Field of Classification Search
CPC .......... G06Q 30/0627; G06Q 30/0276; G06Q 30/0201; G06Q 30/0277; G06Q 30/0242; G06Q 30/0603; G06F 16/906; G06F 16/951

USPC .......................................................... 707/737
See application file for complete search history.

(56) References Cited

U.S. PATENT DOCUMENTS

| | | | | |
|---|---|---|---|---|
| 6,029,141 | A * | 2/2000 | Bezos | G06Q 20/0855 705/26.41 |
| 7,853,588 | B2 * | 12/2010 | Le Ouay | G06F 16/90 707/726 |
| 8,326,658 | B1 * | 12/2012 | Lee | G06Q 30/0201 705/7.11 |
| 8,438,080 | B1 * | 5/2013 | Xiao | G06Q 30/0201 705/27.1 |
| 8,505,094 | B1 * | 8/2013 | Xuewen | H04L 63/1416 726/22 |
| 8,713,007 | B1 * | 4/2014 | Korolev | G06N 20/00 707/729 |
| 10,290,032 | B2 * | 5/2019 | Koch | G06K 9/6263 |
| 2009/0024554 | A1 * | 1/2009 | Murdock | G06Q 30/02 706/48 |
| 2011/0093331 | A1 * | 4/2011 | Metzler | G06Q 30/0251 705/14.49 |

(Continued)

*Primary Examiner* — Mahesh H Dwivedi
(74) *Attorney, Agent, or Firm* — Cesari & McKenna, LLP

(57) ABSTRACT

Methods and systems are described herein for generating structured classification data of a website. A computing device captures a plurality of webpages from a website. The computing device extracts data from each of the plurality of webpages based upon a plurality of features. The computing device generates a plurality of classes for each of the plurality of webpages by using a plurality of classifiers. The computing device assigns a consensus class to each webpage based upon the plurality of classes for the plurality of webpages.

40 Claims, 2 Drawing Sheets

(56) References Cited

U.S. PATENT DOCUMENTS

| | | | |
|---|---|---|---|
| 2012/0109961 A1* | 5/2012 | Raichelgauz | G06F 16/14 |
| | | | 707/737 |
| 2012/0158496 A1* | 6/2012 | Solomon | G06Q 30/0251 |
| | | | 705/14.49 |
| 2012/0284119 A1* | 11/2012 | Hu | G06Q 30/0276 |
| | | | 705/14.52 |
| 2012/0284266 A1* | 11/2012 | Chandraghatgi | G06F 16/355 |
| | | | 707/737 |
| 2014/0032263 A1* | 1/2014 | Kalikivayi | G06F 40/205 |
| | | | 705/7.29 |
| 2015/0033331 A1* | 1/2015 | Stern | H04L 63/1425 |
| | | | 726/22 |
| 2015/0106078 A1* | 4/2015 | Chang | G06F 16/35 |
| | | | 704/9 |
| 2015/0193832 A1* | 7/2015 | Zhu | G06Q 30/0631 |
| | | | 705/14.72 |
| 2016/0125061 A1* | 5/2016 | Neiman | G06F 16/951 |
| | | | 707/737 |
| 2016/0132926 A1* | 5/2016 | Zimmerman, Jr. | |
| | | | G06Q 30/0277 |
| | | | 705/14.53 |
| 2018/0032599 A1* | 2/2018 | Larsen | G06F 16/285 |
| 2018/0137560 A1* | 5/2018 | Chopra | G06F 9/451 |
| 2018/0189828 A1* | 7/2018 | Luce | G06Q 30/0254 |
| 2018/0341955 A1* | 11/2018 | Amarthaluri | G06Q 30/0201 |

* cited by examiner

GENERATING STRUCTURED CLASSIFICATION DATA OF A WEBSITE

TECHNICAL FIELD

The present technology relates to systems, methods, and computer program products for generating structured classification data of a website.

BACKGROUND

Websites, such as e-commerce platforms and online content platforms (e.g., publisher sites), are comprised of a complex collection of webpages and related data elements, arranged in a defined structure. Often, groups of individual webpages of a website are similar in certain aspects—for example, the product webpages of an online retailer may have the same or similar layout, URL structure, image structure, metadata, and so forth.

However, existing computerized tools for analyzing the structure and content of websites—e.g., spiders, bots, crawlers—are not able to intelligently analyze specific visual and non-visual features of individual webpages to determine whether groups of webpages can be formed into specific classes based both on select features of the webpages (e.g., URL, document object model (DOM), images, layout, CSS, and so forth) and on an overall class of the webpage as related to other webpages from the site.

SUMMARY

Accordingly, there is a need for technology to dynamically and programmatically capture and extract data from a plurality of webpages of a website, then analyze the extracted data to classify the webpages according to their features and build a structured wireframe of the website. As a result, computing applications that require a deep knowledge of the website's structure—including the aggregation of individual webpages into classes—can leverage the classifications in specifically-defined applications. The systems and methods described herein provide the technical improvement of analyzing, storing, and correlating certain specialized webpage structure data in specific data structures in order to make processing the data more efficient and accurate from a computing perspective.

In one aspect, there is a method of generating structured classification data of a website. A computing device captures a plurality of webpages from a website. The computing device extracts data from each of the plurality of webpages based upon a plurality of features. The computing device generates a plurality of classes for each of the plurality of webpages by using a plurality of classifiers to analyze the extracted data. The computing device assigns a consensus class to each webpage based upon the plurality of classes for the webpage.

In another aspect, there is a system for generating structured classification data of a website. The system comprises a computing device that captures a plurality of webpages from a website. The computing device extracts data from each of the plurality of webpages based upon a plurality of features. The computing device generates a plurality of classes for each of the plurality of webpages by using a plurality of classifiers to analyze the extracted data. The computing device assigns a consensus class to each webpage based upon the plurality of classes for the webpage.

Any of the above aspects can include one or more of the following features. In some embodiments, the website is an ecommerce platform from a retailer selling online goods or services. In some embodiments, the website is an online content platform selling advertising placements.

In some embodiments, the plurality of features comprise one or more of: a URL of the webpage, attributes of one or more images on the webpage, a document object model (DOM) of the webpage, a tracking element contained within the webpage, one or more color sets of the webpage, webpage metadata, webpage content, webpage layout & CSS, or attributes of one or more advertisements on the webpage. In some embodiments, the plurality of classifiers are based on one or more of unsupervised clustering algorithms. In some embodiments, the plurality of unsupervised clustering algorithms are based on one or more of: a mean shift algorithm, a Lloyd's algorithm, or a distance computation as provided by an O(ND) algorithm.

In some embodiments, each webpage is assigned one class for each classifier. In some embodiments, the computing device aggregates the plurality of classes for each webpage as generated by one or more of the plurality of classifiers into a preferred class for the webpage. In some embodiments, the computing device determines whether one or more of the webpages are product webpages based upon a class assigned to another webpage that is a product webpage. In some embodiments, determining whether one or more of the webpages are product webpages comprising comparing a URL associated with the determined product webpages with a URL of to another webpage that is a product webpage. In some embodiments, the another webpage that is a product webpage is a manually-provided URL. In some embodiments, the another webpage that is a product webpage is automatically inferred based on similarities with other websites.

In some embodiments, the computing device determines one or more attributes of one or more products appearing on each webpage that is determined to be a product webpage. In some embodiments, the computing device generates a product catalog based upon the determined one or more attributes of the one or more products. In some embodiments, the computing device compares the one or more attributes of the products as appearing in at least one of the webpages with one or more attributes of the product as stored in a product catalog. In some embodiments, the product catalog is previously provided by a provider of the website and the product catalog is stored on the computing device.

In some embodiments, the computing device determines one or more differences between the one or more attributes of the product as displayed in at least one of the webpages and the one or more attributes of the product as stored in the product catalog. In some embodiments, the computing device updates the one or more attributes of the product as stored in the product catalog based upon the one or more differences. In some embodiments, the one or more attributes of the product comprise: a price, a product name, a product category, a product discount, a product availability, product description, product rating, product color, product size, a product image, or a product video.

In some embodiments, the computing device generates one or more graphical display advertisements based upon one or more attributes of the one or more products. In some embodiments, the graphical display advertisements are used for one or more of: generating banner previews for prospective advertisements; or automatically launching a catalog-based advertisement campaign.

In some embodiments, the computing device generates one or more attributes for each product appearing in the product webpages, when at least one of the one or more attributes does not exist in the product catalog. In some embodiments, the plurality of attributes comprise one or more of: image data, video data, price data, availability data, product description, product rating, product color, product size, or related products data.

In some embodiments, the computing device identifies one or more instrumentations associated with the webpages that are assigned a same class. In some embodiments, the instrumentations associated with the webpages comprise one or more of: tracking, analytics, or advertisement display. In some embodiments, the computing device determines one or more changes overt time to at least one of the one or more instrumentations on the webpages that are assigned the same class. In some embodiments, the computing device detects one or more new clusters of webpages where instrumentation opportunities exist.

In some embodiments, the computing device identifies one or more style attributes associated with the webpages that are assigned a same class. In some embodiments, the style attributes comprise one or more of: color sets, font families, font sizes, font decorations, or border styles. In some embodiments, the computing device generates one or more graphical display advertisements that include the one or more style attributes associated with the webpages that are assigned the same class and inserts the graphical display advertisements into one or more inventory placements on one or more of the webpages. In some embodiments, the one or more graphical display advertisements are inserted by a call to an ad server in the original webpage. In some embodiments, the computing device prevents one or more graphical display advertisements from being placed into one or more of the inventory placements on the webpages that are assigned a set of blacklisted classes. In some embodiments, the one or more graphical display advertisements are associated with a campaign of an advertiser.

In some embodiments, the computing device identifies one or more inventory placement identifiers contained in more than one of the webpages that are assigned different classes. In some embodiments, each of the one or more inventory placement identifiers is associated with one or more characteristics including: a location of an inventory placement on the webpage, a size of an inventory placement on the webpage, a highlighting of an inventory placement on the webpage, or a visibility of an inventory placement on the webpage. In some embodiments, each inventory placement associated with each of the one or more inventory placement identifiers provides a different opportunity for user interaction based upon the characteristics associated with the inventory placement identifier. In some embodiments, the different opportunity for user interaction is associated with a price.

In some embodiments, the computing device transmits a notification message that one or more inventory placements associated with the inventory placement identifiers are configured incorrectly on more than one of the webpages that are assigned different classes. In some embodiments, the computing device identifies one or more changes on one or more of the webpages that are assigned a same class. In some embodiments, the changes comprise one of more of: one or more new classes, a change to a number of webpages in the class, a change to one or more attributes of one or more images on the webpage, a change to a document object model (DOM) of the webpage, a change to a tracking element contained within the webpage, a change to one or more color sets of the webpage, a change to webpage metadata, a change to webpage content, a change to webpage layout and/or CSS, or a change to one or more attributes of one or more advertisements on the webpage. In some embodiments, the computing device transmits a notification message relating to the one or more changes on one or more of the webpages that are assigned the same class.

In some embodiments, the computing device determines one or more graphical display advertisements to be inserted into one or more inventory placements on each webpage based upon the assigned consensus class of the webpage. In some embodiments, the one or more graphical display advertisements are determined based upon advertisement performance criteria associated with the assigned consensus class of the webpage. In some embodiments, the advertisement performance criteria include one or more of: ad view data, user interaction data, or conversion data.

In some embodiments, the computing device assigns a weight to each webpage based upon a count of the webpages of the website that are assigned to a same class. In some embodiments, the computing device determines one or more graphical display advertisements to be inserted into one or more inventory placements on each webpage based upon advertisement performance criteria associated with the assigned weight of the webpage. In some embodiments, the advertisement performance criteria include one or more of: ad view data, user interaction data, or conversion data.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

The present technology provides systems and methods for generating structured classification data of a website. Although the technology is illustrated and described herein with reference to specific embodiments, the technology is not intended to be limited to the details shown. Various modifications can be made in the details within the scope the claims and without departing from the technology.

Figure 1:
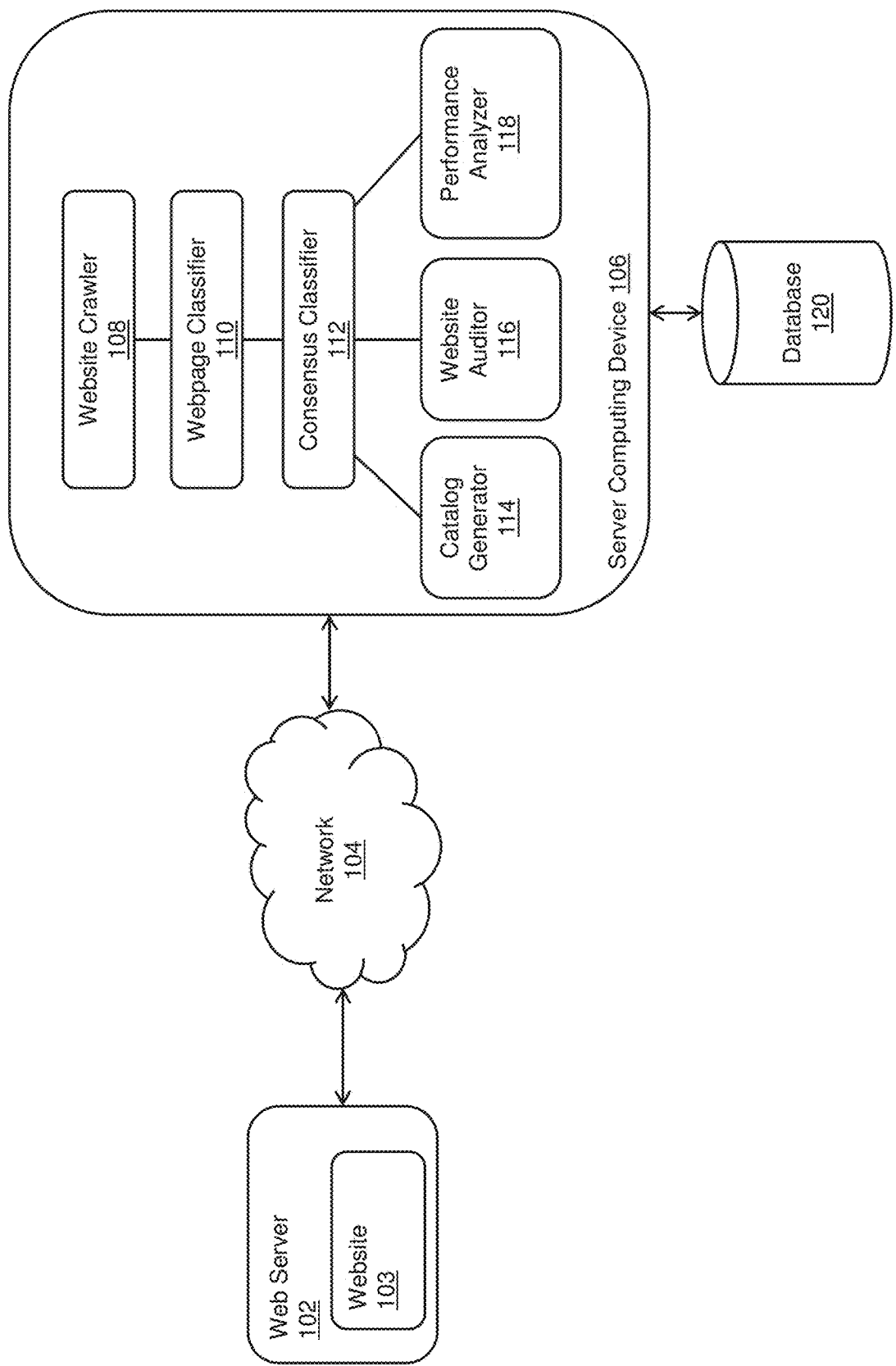
FIG. 1 is a diagram of a networked system in accordance with embodiments of the technology.

FIG. 1 is a diagram of networked system 100 in accordance with embodiments of the technology. As illustrated, networked system 100 can include a web server 102 (e.g., a computing device or devices) that hosts website 103. In some embodiments, the website 103 is an e-commerce platform from a retailer selling online goods or services. In some embodiments, the website 103 is an online content platform selling advertising placements. Typically, the website 103 comprises a plurality of visual and non-visual elements that make up the content transmitted and displayed to a user when, e.g., browser software and/or application software on a remote computing device connects to the web server 102 via a communications network (e.g., Internet) and requests content from the website 103. The elements of a website include, but are not limited to, webpages (e.g., HTML documents), image files, layouts, color sets, stylesheets, document object models (DOM), tracking elements, instrumentations (e.g., analytics, advertisement display, etc.), metadata, URLs, advertisements, and content (e.g., text, audio, video).

The network 104 enables the web server 102 and the server computing device 106 to communicate with each other in order to perform the process of generating structured classification data of a website (e.g., website 103) as described herein. The network 104 may be a local network, such as a LAN, and/or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware, including one or more special-purpose processors and one or more physical memory modules, and specialized software engines that execute on the processor of the server computing device 106, to receive data from other components of the system 100, transmit data to other components of the system 100, and perform functions for generating structured classification data of a website (e.g., website 103) as described herein. The processor of the server computing device 106 executes a website crawler 108, a webpage classifier 110, a consensus classifier 112, a catalog generator 114, a website auditor 116, and a website performance predictor 118. In some embodiments, elements 108, 110, 112, 114, 116, and 118 are specialized sets of computer software instructions programmed onto a dedicated processor in the server computing device 106 and can include specifically-designated memory locations and/or registers for executing the specialized computer software instructions. Further explanation of the specific processing performed by elements 108, 110, 112, 114, 116, and 118 will be provided below.

The database 120 is a computing device (or in some embodiments, a set of computing devices) that is coupled to the server computing device 106 and is configured to receive, generate, and store specific segments of data relating to the process of generating structured classification data of a website (e.g., website 103) as described herein. In some embodiments, all or a portion of the database 120 can be integrated with the server computing device 106 or be located on a separate computing device or devices. For example, the database 120 can comprise one or more databases, such as MySQL™ available from Oracle Corp. of Redwood City, California.

Figure 2:
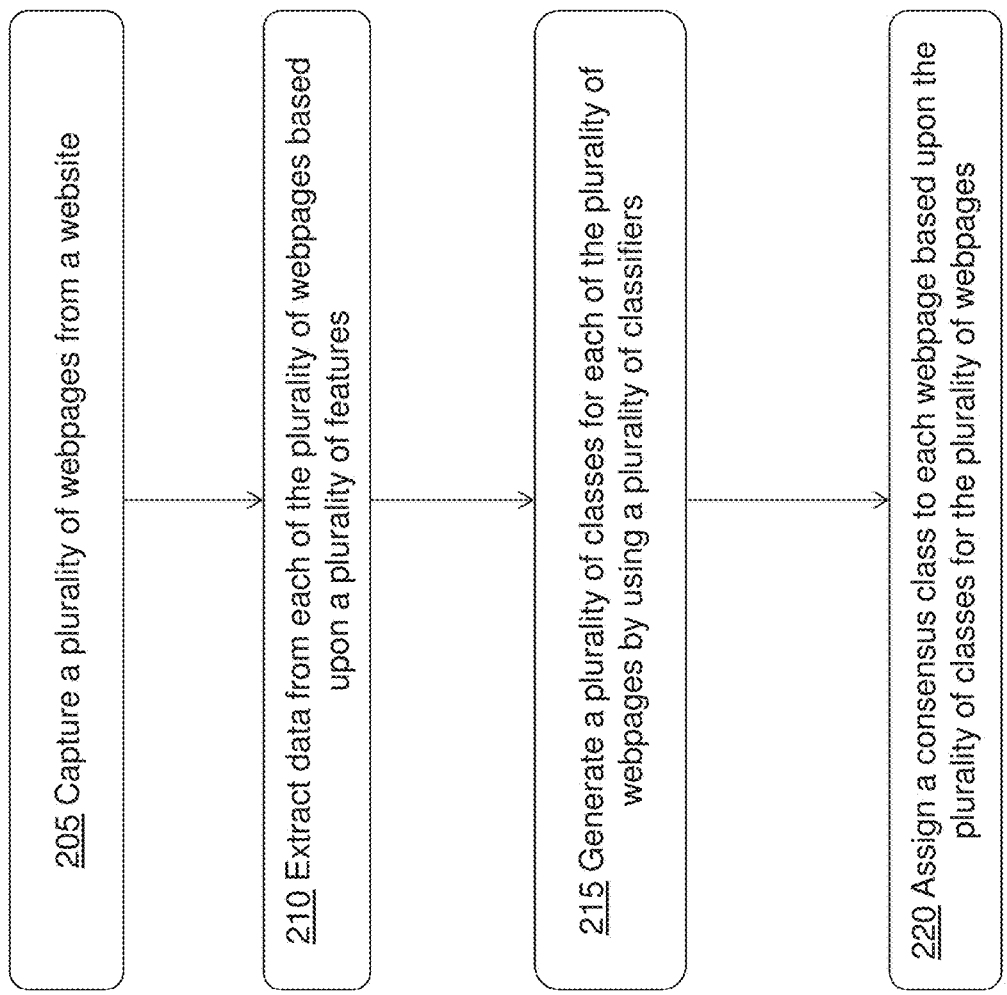
FIG. 2 is a flow diagram of a computerized method of generating structured classification data of a website.

FIG. 2 is a flow diagram of a computerized method 200 of generating structured classification data of a website (e.g., website 103), using the system 100 of FIG. 1. The website crawler 108 of server computing device 106 captures (205) a plurality of webpages from website 103. For example, the crawler 108 establishes a connection to web server 102 and systematically captures the webpages that comprise the website 103 by, e.g., downloading the webpages (and, in some cases, the related and/or linked visual and non-visual elements that are referred to in each of the webpages) and storing the downloaded data in database 120. The crawler 108 can access each of the webpages in website 103 by analyzing an initial webpage (e.g., a seed URL), and then following links contained within the initial webpage to traverse the other webpages within the website. In some embodiments, the crawler 108 can use site maps or other metadata about the structure of the website 103 to perform the capture operation.

The crawler 108 then extracts (210) data from each of the plurality of captured webpages based upon a plurality of features. As an example, the crawler 108 analyzes different features in each captured webpage, such as: the URL of the webpage, attributes of images contained in the webpage and/or referred to by the webpage (e.g., size, placement, distribution), a document object model (DOM) of the webpage, a tracking element (e.g., event tracker, click tracker) of the webpage, one or more color sets of the webpage, metadata of the webpage (e.g., tags, description, summary, title, and so forth), content contained in the webpage and/or referred to by the webpage (e.g., text, audio, video), layout and/or stylesheet data of the webpage (e.g., CSS), and attributes of advertisements on the webpage (e.g., size, location, and the like). The crawler 108 extracts data associated with each of a plurality of different features of the website and stores the extracted feature data in database 120.

The webpage classifier 110 retrieves the extracted feature data from database 120 and generates (215) a plurality of classes for each of the plurality of webpages based upon the extracted feature data. Specifically, the webpage classifier 110 executes a plurality of feature classifiers that analyze the extracted feature data and determine a plurality of classes that should be assigned to each webpage based upon that webpage's feature data. In some embodiments, the plurality of feature classifiers each comprises an unsupervised clustering algorithm that groups webpages with similar data elements and distinguishes webpages with dissimilar data elements. Exemplary unsupervised clustering algorithms include, but are not limited to, a mean shift algorithm, a Lloyd's algorithm, or a distance computation as provided by an O(ND) algorithm.

The webpage classifier 110 uses the plurality of feature classifiers to determine a class (for each feature) to which the webpage belongs. In one example, one of the feature classifiers analyzes the URL of the webpage (e.g., syntax, structure, and the like) and compares the URL, or subelements of the URL, to the URL of previously-classified webpages that are in a particular class—such as a product webpage class—and determines that the URLs are similar. Other feature classifiers can analyze, e.g., the images of the webpage, the DOM of the webpage, the tracking elements of the webpage, and so forth. Each feature classifier results in the assignment of a class to the webpage—such that each webpage can have multiple classes assigned, one for each feature classifier. A specific example is a list of sizes of all images of the webpage. By extracting the threshold of the first two percentiles of sizes distribution, we train a mean shift model which will provide us with a class for each webpage.

Once the webpage classifier 110 has generated the plurality of classes for the webpage, the consensus classifier 112 analyzes the plurality of classes and assigns (220) a consensus class to the webpage based upon the plurality of classes. For example, the consensus classifier 112 can determine that the classes assigned to the webpage, when evaluated in aggregate, indicate that the webpage is a product webpage—meaning that the webpage provides information/content relating to a product being sold by an online retailer. Continuing with the example, the URL may be classified as a product URL, the DOM may be classified as a product DOM, the image(s) may be classified as product images, and the tracking elements may be classified as product tracking elements. In some embodiments, the consensus classifier 112 compares the aggregated (and/or individual) classes assigned to the webpage with the aggregated (and/or individual) classes assigned to other previously-classified webpages in order to determine which consensus class should be assigned to the webpage. This consensus class can, in some cases, be considered as a preferred class for the webpage. A specific example is to define a similarity metric between the set of classes generated by three classifiers, such as the image classifier, the DOM classifier and the URL classifier. For each classifier, we compute similarities with every other classifiers. This way, we will know the similarities between the image classifier versus the DOM classifier and versus the URL classifier (and same for the DOM and URL classifier). The consensus class for every page is defined as the class determined by the classifier that has the most similarities with others. Here, the image classifier has a 95% similarity with the URL classifier and 12% similarity with the DOM classifier. The URL classifier has a 7% similarity with the DOM classifier. In our example, the consensus class will be determined by the image classifier, as it has a higher sum of similarity scores.

Typically and preferably, the consensus classifier 112 automatically executes the above-described analysis of webpages and their assigned classes, comparison to previously-classified webpages, and assignment of a consensus class to the webpage. For example, the classifier 112 can automatically infer that another webpage is, e.g., a product webpage based upon its similarities with other webpages and websites. In some embodiments, it should be appreciated that the comparison of classes (and/or features) of a particular webpage to other webpages can be conducted by requiring input to provide the individual classes or features of the other webpages (such as a manually-provided URL that is known to be a product webpage).

Once the consensus classifier 112 has assigned a consensus class to each webpage of the website 103, the website can be considered as classified. An important facet of the methods and systems described herein is leveraging the classified website to perform a variety of different applications based upon the specific consensus class and individual feature classes assigned to each webpage.

One application is the automatic generation of a product catalog from a website, and the automatic validation of an externally-sourced product catalog, using the structured classification data assigned to the webpages by the webpage classifier 110 and consensus classifier 112, as described above. The server computing device 106 includes a catalog generator 114 that executes programmatic instructions to generate a product catalog (e.g., a set of structured data that defines attributes of products offered for sale) based upon the classified webpages of website 103, in the case where the website 103 is an e-commerce platform from a retailer selling online goods or services. The catalog generator 114 can generate a product catalog by identifying one or more webpages from website 103 that have been assigned a product consensus class (and/or where one or more of the feature classifiers have assigned a product class to the webpage). Once the generator 114 has identified product webpages, the generator 114 determines one or more attributes of products appearing on each of the webpages that are identified as product webpages. For example, the generator 114 can extract certain attributes of the products that are defined in the webpage—such as: product price, product category, product discount, product availability, product description, product rating, product color, product size, product image(s), and the like. The generator 114 can store the extracted product attributes in database 120 in a product catalog structure. The generator 114 can also create attributes for products appearing in one or more of the webpages, in the event that the attributes do not exist in the externally-sourced product catalog. For example, the attributes can include image data, video data, price data, availability data, product description, product rating, product color, product size, and/or related products data.

The generator 114 can also use the extracted product attributes (and/or the automatically-generated product catalog) to compare against an existing product catalog (as provided by an external source, such as the provider of website 103) and determine whether there are differences between the existing product catalog and the automatically-generated product catalog created using the classified webpage data. For example, the generator 114 can compare attributes of products as extracted from identified product class webpages to the same attributes of the products as stored in the existing product catalog to determine differences between the respective attributes. In one example, the price of a product as stored in the existing product catalog may not match the price of the same product as extracted from the webpage for the product as extracted from the website 103. The product attribute comparison feature, by leveraging the classified webpage data generated by the system 100, enables fast and efficient validation of a product catalog against 'live' or near real-time website data—such that retailers and other vendors can confirm the accuracy of the product listings on their webpages and also identify discrepancies that could lead to customer dissatisfaction.

Also, the catalog generator 114 can use the extracted product attribute data from webpages assigned to a product class (or product consensus class) to augment the existing product catalog with additional data that may not currently be in the product catalog. For example, the webpage on website 103 that corresponds to a particular product may contain additional visual data (e.g., images, videos, etc.) that is not found in the existing product catalog maintained by the retailer. The catalog generator 114 can quickly extract the visual data (and/or relevant elements of the visual data) and transmit it to a remote computing device that stores the existing product catalog for the purpose of updating the catalog. In another example, the catalog generator 114 can provide real-time updates to certain volatile product data (e.g., price, availability) by extracting the volatile data from the webpage(s) that are classified as product webpages and transmitting the extracted volatile data to the remote computing device for storage in the product catalog.

The catalog generator 114 can also generate graphical display advertisements (e.g., for distribution to ad exchanges or publisher websites) based upon the product attribute data extracted from the product class webpages. For example, the generator 114 extracts product attribute data from the webpage(s) classified as product webpages and creates a graphical display advertisement (e.g., using product description, style elements, image and price data retrieved from database 120). The graphical display advertisement can be used for a variety of applications, such as quickly providing a preview (e.g., a banner preview) of a display advertisement or for launching a catalog-based digital advertising campaign without requiring substantial time investment.

Another application using the structured classification data for the webpages of website 103 is the automatic auditing of the website 103, e.g., for purposes of validating technical features and determining changes to technical features, classifying sections of the website 103 based upon characteristics like color sets and advertising placements, and blacklisting certain sections of the website for purposes of advertising campaigns—advantageously when the website is an online content platform (e.g., a publisher site) that sells advertising placements. The server computing device 106 includes a website auditor 116 that executes programmatic instructions to evaluate aspects of different classes of webpages—such as those mentioned above. The auditor 116 retrieves one or more webpages based upon the consensus class assigned to the webpages. For example, the webpages that are assigned to the same consensus class can be considered as a 'section' of the website.

The auditor 116 analyzes one or more attributes of the webpages that are assigned to the same consensus class (and/or the same feature class(es)). For example, the auditor 116 can identify one or more instrumentations (such as: tracking features, analytics, and advertisement features) associated with the webpages that are assigned to the same class. In some cases, the identified instrumentations may exist on certain webpages in the same class but not on other webpages in the class. In some cases, the instrumentations can change over time. The auditor 116 recognizes these differences and/or changes over time to the instrumentations, which leads to actionable information to improve, e.g., an advertiser's interaction with the webpages. For example, an advertiser may want to understand when instrumentation changes on a particular website (or section within the website) so that the advertiser can adjust its technology to account for the changes. In addition, the information provided by the auditor 116 can be used to detect new sections or clusters of webpages in a website where new instrumentation opportunities exist. In another example, the information collected by the auditor 116 can include classifying certain sections of a website based upon the similarity of style attributes—such as color sets, font families, font sizes, font decorations, border styles—associated with webpages in the section. An advertiser can then use the determined style attribute data to, e.g., generate customized graphical display advertisements that include one or more of the style attributes associated with a specific webpage or section of the website, for insertion into one or more inventory placements on the webpages that are assigned the same style attribute class. In one example, the graphical display advertisements can be inserted by a call to an ad server computing device in the original webpage.

In another example, the auditor 116 can classify sections of a publisher website based upon, e.g., content displayed on webpages in the section. An advertiser can then use the classification information to, e.g., blacklist certain advertising campaigns on specific sections (e.g., if the content displayed in the section is not compatible with the advertiser's goals or target audience, etc.).

The website auditor 116 also identifies one or more inventory placement identifiers contained in more than one of the webpages that are assigned different consensus classes (and/or different feature classes). An inventory placement identifier can correspond to characteristics of an advertising inventory placement for the webpage, such as a location of the inventory placement on the webpage, a size of the inventory placement on the webpage, a highlighting of the inventory placement on the webpage, and a visibility of the inventory placement on the webpage. The characteristics of each inventory placement associated with each of the different inventory placement identifiers can be used to provide a different opportunity for user interaction (i.e., higher or lower probability for interaction from a user). For example, the characteristics of an inventory placement can affect a price that an advertiser would pay for the inventory placement—e.g., some inventory placements may be more desirable because the characteristics indicate that a user is more likely to interact with the advertisement, and thus warrant paying a higher price for the opportunity to place an advertisement in the inventory placement. In some embodiments, the website auditor 116 also identifies that one or more inventory placements associated with the inventory placement identifiers are configured incorrectly on more than one of the webpages that are assigned different classes. For example, the size of an inventory placement associated with the same inventory placement identifier may differ between a first webpage that is assigned a particular consensus class and a second webpage from the same website that is assigned another consensus class. The website auditor 116 can transmit a notification message (e.g., to an administrator of the website) indicating the incorrect configuration.

Furthermore, the website auditor 116 can be configured to identify one or more changes on one or more of the webpages that have been assigned the same consensus class (and/or the same feature class(es)). For example, as the website 103 changes over time, attributes of individual webpages of the website may change. The changes can include, but are not limited to: a new consensus class and/or feature class(es), a change to a number of webpages in the consensus class (and/or feature class), a change to one or more attributes of one or more images on the webpage, a change to a DOM of the webpage, a change to a tracking element contained in the webpage, a change to one or more color sets of the webpage, a change to webpage metadata, a change to webpage content, a change to webpage layout and/or CSS, and a change to one or more attributes of one or more advertisements on the webpage. Upon detecting a change on one or more of the webpages in the class, the website auditor 116 can transmit a notification message relating to the one or more changes on the webpages to, e.g., an administrator of the website. In some embodiments, changes to a webpage or a set of webpages that have been assigned to a particular consensus class and/or feature classes may require that the system 100 re-assign the webpage to a different consensus class and/or feature classes. The system 100 can automatically analyze the notification message from the website auditor 116 to execute the webpage classifier 110 and consensus classifier 112 (as described previously) on the webpage or webpages to re-classify the webpages.

Another application using the structured classification data for the webpages of website 103 is the analysis of advertisement performance criteria associated with the webpages that are assigned to a particular consensus class or feature classes. The server computing device 106 includes a performance analyzer 118 that performs a variety of functions, including determining graphical display advertisements to be inserted into one or more inventory placements on each webpage based upon the assigned consensus class (and/or feature classes) of the webpage. In some embodiments, the performance analyzer 118 determines graphical display advertisements to be inserted based upon advertisement performance criteria associated with the assigned consensus class. For example, historical ad performance data can indicate that advertisements with certain criteria, when placed on webpages assigned to certain classes, have better performance (e.g., with respect to views, interactions, conversions and the like) than when placed on webpages assigned to other classes. Therefore, the performance analyzer 118 can intelligently select graphical display advertisements that have advantageous performance criteria for specific webpages based upon the assigned class of the webpage.

In addition, the performance analyzer 118 can generate additional information regarding the webpages and their corresponding consensus classes and feature classes that can enable advertisers to generate better predictions regarding the performance of graphical display advertisements on the webpages and thus impact the evaluation of bid opportunities and subsequent bids for such advertisement inventory placements. In one embodiment, the performance analyzer 118 can assign a weight to each webpage based upon a count of the webpages of the website that are assigned to the corresponding consensus class and/or feature classes. For example, a publisher website may have webpages that are spread across a plurality of consensus classes, with the majority of webpages assigned to, e.g., a content consensus class. Therefore, the analyzer 118 can determine that the webpages assigned to the content class should receive a higher weight value than webpages assigned to other classes (e.g., because of the probability that users of the website are likely to be viewing a content webpage versus other classes of webpages and thus the advertisement inventory placements on those pages are more valuable). Based upon the weight value, the analyzer 118 can determine one or more graphical display advertisements to be inserted into one or more inventory placements on each webpage based upon, e.g., advertisement performance criteria (such as ad view data, user interaction data, and conversion data) associated with the assigned weight. The performance analyzer 118 can also be configured to provide other functionality, including tracking the online behavior of users of the website (e.g., similarities of interactions) when the users navigate between webpages that are assigned to different consensus classes.

It should be appreciated that the systems and methods described herein provide functionality to achieve a fully-automated creation of structured website data, using clustering algorithms, to classify all of the webpages of the website. The structured website data is advantageous in a variety of contexts, including applications that require deep knowledge of a target website (such as web marketing campaigns, advertising opportunities, technical analysis of classifications, and the like).

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application specific-integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A method for generating structured classification data of a website, the method comprising:
   capturing, by a computing device, a plurality of webpages from a website;
   extracting, by the computing device, data from each of the plurality of webpages based upon a plurality of features;

generating, by the computing device, a plurality of candidate classes for each of the plurality of webpages by using a plurality of classifiers to analyze the extracted data, including applying each of the plurality of classifiers to a portion of the extracted data corresponding to a different one of the plurality of features and determining at least two candidate classes for the webpage based upon each of the plurality of classifiers, each candidate class for the webpage being different from and non-overlapping with the other candidate classes for the webpages;

assigning, by the computing device, a consensus class to each webpage based upon the plurality of candidate classes for the webpage, including (i) determining a similarity score between each of the generated candidate classes from each of the plurality of classifiers and each of a plurality of classes generated by the plurality of classifiers and assigned to a previously-classified webpage and (ii) assigning the candidate class associated with a highest similarity score to the webpage as the consensus class;

for webpages assigned a product class as the consensus class:
determining, by the computing device, one or more attributes of one or more products appearing on each webpage;
comparing, by the computing device, the one or more attributes of the products as appearing in at least one of the webpages with one or more attributes of the product stored in a product catalog;
determining, by the computing device, one or more differences between the one or more attributes of the product as displayed in at least one of the webpages and the one or more attributes of the product stored in the product catalog;
updating, by the computing device, the one or more attributes of the product stored in the product catalog based upon the one or more differences; and
generating, by the computing device, one or more graphical display advertisements based upon one or more updated attributes of the one or more products stored in the product catalog.

2. The method of claim 1, wherein the website is an ecommerce platform from a retailer selling online goods or services.

3. The method of claim 1, wherein the website is an online content platform selling advertising placements.

4. The method of claim 1, wherein the plurality of features comprise one or more of: a Uniform Resource Locator (URL) of the webpage, attributes of one or more images on the webpage, a document object model (DOM) of the webpage, a tracking element contained within the webpage, one or more color sets of the webpage, webpage metadata, webpage content, webpage layout and Cascading Style Sheets (CSS) data, or attributes of one or more advertisements on the webpage.

5. The method of claim 1, wherein the plurality of classifiers are based on one or more unsupervised clustering algorithms.

6. The method of claim 5, wherein the one or more unsupervised clustering algorithms comprise: a mean shift algorithm, a Lloyd's algorithm, or a distance computation as provided by an O(ND) algorithm.

7. The method of claim 1, wherein each webpage is assigned one candidate class for each classifier.

8. The method of claim 1, further comprising aggregating, by the computing device, the plurality of candidate classes for each webpage as generated by one or more of the plurality of classifiers into a preferred class for the webpage.

9. The method of claim 2, wherein the step of determining whether one or more of the webpages are product webpages comprising comparing a URL associated with the determined product webpages with a URL of to another webpage that is a product webpage.

10. The method of claim 2, wherein another webpage that is a product webpage is a manually provided URL.

11. The method of claim 2, wherein another webpage that is a product webpage is automatically inferred based on similarities with other websites.

12. The method of claim 2, wherein the product catalog is previously provided by a provider of the website and the product catalog is stored on the computing device.

13. The method of claim 2, wherein the one or more attributes of the product comprise: a price, a product name, a product category, a product discount, a product availability, product description, product rating, product color, product size, a product image, or a product video.

14. The method of claim 2, wherein the graphical display advertisements are used for one or more of:
generating banner previews for prospective advertisements; or
automatically launching a catalog-based advertisement campaign.

15. The method of claim 2, further comprising generating, by the computing device, one or more attributes for each product appearing in the product webpages, when at least one of the one or more attributes does not exist in the product catalog.

16. The method of claim 15, wherein the plurality of attributes comprise one or more of: image data, video data, price data, availability data, product description, product rating, product color, product size, or related products data.

17. The method of claim 1, further comprising identifying, by the computing device, one or more instrumentations associated with the webpages that are assigned a same consensus class.

18. The method of claim 17, wherein the instrumentations associated with the webpages comprise one or more of: tracking, analytics, or advertisement display.

19. The method of claim 17, further comprising determining, by the computing device, one or more changes over time to at least one of the one or more instrumentations on the webpages that are assigned the same consensus class.

20. The method of claim 17, further comprising detecting, by the computing device, one or more new clusters of webpages where instrumentation opportunities exist.

21. The method of claim 3, further comprising identifying, by the computing device, one or more style attributes associated with the webpages that are assigned a same consensus class.

22. The method of claim 21, wherein the one or more style attributes comprise one or more of: color sets, font families, font sizes, font decorations, or border styles.

23. The method of claim 21, further comprising:
generating, by the computing device, one or more graphical display advertisements that include the one or more style attributes associated with the webpages that are assigned the same consensus class; and
inserting, by the computing device, the graphical display advertisements into one or more inventory placements on one or more of the webpages.

24. The method of claim 23, wherein the one or more graphical display advertisements are inserted by a call to an ad server in the original webpage.

25. The method of claim 3, further comprising preventing, by the computing device, one or more graphical display advertisements from being placed into one or more of the inventory placements on the webpages that are assigned a set of blacklisted classes.

26. The method of claim 25, wherein the one or more graphical display advertisements are associated with a campaign of an advertiser.

27. The method of claim 1, further comprising identifying, by the computing device, one or more inventory placement identifiers contained in more than one of the webpages that are assigned different consensus classes.

28. The method of claim 27, wherein each of the one or more inventory placement identifiers is associated with one or more characteristics including: a location of an inventory placement on the webpage, a size of an inventory placement on the webpage, a highlighting of an inventory placement on the webpage, or a visibility of an inventory placement on the webpage.

29. The method of claim 28, wherein each inventory placement associated with each of the one or more inventory placement identifiers provides a different opportunity for user interaction based upon the characteristics associated with the inventory placement identifier.

30. The method of claim 29, wherein the different opportunity for user interaction is associated with a price.

31. The method of claim 27, further comprising transmitting, by the computing device, a notification message that one or more inventory placements associated with the inventory placement identifiers are configured incorrectly on more than one of the webpages that are assigned different consensus classes.

32. The method of claim 1, further comprising identifying, by the computing device, one or more changes on one or more of the webpages that are assigned a same consensus class.

33. The method of claim 32, wherein the changes comprise one of more of: one or more new candidate classes, a change to a number of webpages in the consensus class, a change to one or more attributes of one or more images on the webpage, a change to a document object model (DOM) of the webpage, a change to a tracking element contained within the webpage, a change to one or more color sets of the webpage, a change to webpage metadata, a change to webpage content, a change to webpage layout and/or CSS, or a change to one or more attributes of one or more advertisements on the webpage.

34. The method of claim 32, further comprising transmitting, by the computing device, a notification message relating to the one or more changes on one or more of the webpages that are assigned the same consensus class.

35. The method of claim 3, further comprising determining, by the computing device, one or more graphical display advertisements to be inserted into one or more inventory placements on each webpage based upon the assigned consensus class of the webpage.

36. The method of claim 35, wherein the one or more graphical display advertisements are determined based upon advertisement performance criteria associated with the assigned consensus class of the webpage.

37. The method of claim 36, wherein the advertisement performance criteria include one or more of: ad view data, user interaction data, or conversion data.

38. The method of claim 3, further comprising assigning, by the computing device, a weight to each webpage based upon a count of the webpages of the website that are assigned to a same consensus class.

39. The method of claim 38, further comprising determining, by the computing device, one or more graphical display advertisements to be inserted into one or more inventory placements on each webpage based upon advertisement performance criteria associated with the assigned weight of the webpage.

40. The method of claim 38, wherein the advertisement performance criteria include one or more of: ad view data, user interaction data, and conversion data.

* * * * *